UNITED STATES PATENT OFFICE 2,138,158

SEALING COMPOSITION FOR WATERLESS GAS HOLDERS

William Henry Hampton and Theodore William Doell, Berkeley, Calif., assignors to Standard Oil Company of California, San Francisco, Calif., a corporation of Delaware No Drawing. Application February 9, 1934, Serial No. 710,582

11 Claims. (Cl. 196—149)

This invention relates to improved compositions for effecting a gas-tight seal between the vertically movable disc type piston and the side walls of the enclosing cylinder in so-called "dry" or "waterless" type gas holders.

In all such holders in which the capacity for gas is varied by the rise and fall of a disc type piston within a vertical cylinder some sort of liquid seal must be provided which will effectively prevent the escape of gas between the piston and the cylinder at all vertical positions of the piston within the cylinder and yet will not appreciably retard the free movement of the piston in accommodating variable quantities of gas.

In general a piston is employed which is of appreciably less diameter than the cylinder in which it operates, actual contact with the cylinder walls being made by a variously expansible ring or member which is usually connected to the circumference of the piston through a flexible diaphragm of appropriate sort. Such an assembly provides what is in effect a trough completely surrounding the piston, which trough is kept full to overflowing with the sealing medium, the overflow being allowed to collect in the bottom of the gas holder from whence it is returned to the trough by appropriate pumping means.

Since such general combination may obviously take almost unlimited specific forms each requiring a liquid sealing medium of certain specific qualifications for its best operation, liquid sealing compositions of great variety have been proposed and have met with varying degrees of success.

While water and various water solutions have received some attention the most widely utilized sealing liquids have been of a non-aqueous character consisting of tars and mixtures of tars and oils, sometimes with a filler or weighing agent in addition. Various grades of heavy petroleum oils and even crude oils themselves have sometimes been used. All such materials and combinations of materials of which we are aware have, however, possessed certain defects and shortcomings which have rendered them less than satisfactory in operation.

For instance during operation a certain amount of water invariably enters the liquid sealing system either directly as run-off from rain or snow on the tank roof or by condensation of moisture from the atmosphere. With some oily compositions this water may form emulsions thus, in part at least, destroying the sealing properties of the liquid and necessitating frequent purification or renewal of the sealing medium. When the oily liquid is of such character as to resist ready emulsification but is, as is usually the case, of a density less than that of water the water settles through the oil collecting in the bottom of the trough where it brings about serious corrosion of metal parts and deterioration of the flexible diaphragm material. Where such diaphragm material consists of canvas or other similar fabric this deterioration due to rotting rapidly weakens the diaphragm and necessitates frequent renewals in order to guard against a possible rupture resulting in the free escape of gas to the atmosphere.

In order to prevent water from settling through the sealing medium and coming in contact with canvas and/or metal parts in the bottom of the trough, oily material of greater density than unity has been proposed. Various coal and gas tars having the desired density have been widely used. Such tars however are composed of constituents of very widely different volatility and viscosity. The more volatile portions thus readily escape leaving the less volatile, highly viscous and sometimes even solid constituents which then no longer flow readily into the space to be liquid sealed and are also difficult if not impossible to circulate by pumping.

A two layer composition in which a lower layer of tar of density greater than unity was provided to protect the canvas and metal parts of the trough while an upper layer of density less than unity was provided to effect the actual seal, constituted the next step toward a successful hydrocarbon liquid seal. At first this procedure appeared to meet all of the previous objections since in such a system the top or circulating oil layer could be selected from a wide variety of petroleum stocks and hence could be chosen with substantially any combination of viscosity and volatility necessary for proper operation in a given tank sealing system. It was soon found, however, that such a circulating oil gradually extracted the lighter more fluid constituents from the tar which consequently in a relatively short time would thus become solid and would eventually rupture the canvas or other flexible portion of the sealing trough, thus again requiring a frequent precautionary replacement of the liquid sealing medium.

It is the object of the present invention to provide a sealing liquid for piston type gas holders which is not water miscible, is not readily emulsifiable with water, is relatively non-volatile, is sufficiently viscous to produce an efficient liquid seal against gas passage through a narrow aperture, is sufficiently fluid to readily enter such aperture, is of greater density than water, and is relatively unchanged in viscosity and/or volatility during long periods of exposure to the atmosphere and to such combustible gas compositions as are regularly marketed for commercial and domestic use.

It is a further object of this invention to provide a sealing liquid for "waterless" gas holders the ingredients of which are widely available in adequate quantities, are readily combined without special technique or equipment and are procurable at a cost consistent with the use to which the composition is to be put.

It is still a further object of this invention to provide a means for effecting a gas tight liquid seal in piston displacement gas holders which is so permanent as to require little if any supervision or replacement during long periods of use.

The first discovery leading to this invention was that certain of the heavy petroleum distillates from the more asphaltic California and Mexican crudes contain a small proportion of material having a specific gravity substantially greater than unity and are yet quite fluid at ordinary temperatures. It was next found that these particular constituents are largely concentrated in the extract which results as a by-product in the modern methods of solvent refining lubricating oil distillates. It was then discovered that by proper choice of the extract a material could be prepared which possessed the properties necessary to eliminate all of the difficulties previously enumerated as having heretofore attended the practice of oil sealing the piston type gas holder.

Any of the solvent refining processes which have recently been applied to petroleum distillates and which employ such solvents as liquid sulfur dioxide, sulfur dioxide and benzol, acetone and benzol, furfural, phenol, phenol and water, dichlorethyl ether, aniline, nitrobenzene, pyridine and many others both alone and in various combinations tend to concentrate the relatively heavier constituents of a given petroleum fraction in the extract leaving the relatively lighter components in the raffinate.

It is therefore possible through the correct choice of distillate cut or fraction from a suitable crude to prepare liquid extracts having a specific gravity substantially greater than unity. Since the raffinate and not the extract is the primary product for which such a solvent extraction process will be operated it is usually necessary and fortunately equally possible to accept the extracts which are available from the particular distillates being processed and by proper combination or redistillation and blending to prepare a material of specific gravity greater than unity which we have found to be highly desirable as the basic material from which to prepare liquids for use in sealing "waterless" gas holders.

In some instances it is possible thus to prepare a liquid sealing composition possessing the proper combination of essential characteristics such as fluidity, specific gravity, volatility, chemical stability, etc., directly from the available petroleum extracts without the necessity of adding any material of non-petroleum origin. In other cases where the range of choice of extracts is more limited or in which the crude from which the extracts originate is not of the proper character it may be necessary to add minor proportions of materials of other than petroleum origin in order to obtain the combination of properties desired.

In general the extracts of specific gravity sufficiently above unity to be used alone will be found to be slightly too viscous to flow readily at the temperatures which are likely to be encountered in service. Such extracts, however, have a vapor pressure so low as to make them far better in this respect than is actually required. On the other hand the coal tars and gas tars which, as previously pointed out, are undesirable because of too great volatility are as a rule quite fluid. We have now discovered that when such a tar is blended in proper amount with an appropriate extract from a petroleum distillate a liquid of highly satisfactory specific gravity, volatility and fluidity may result which at the same time undergoes no extensive change in properties during use and is not readily emulsifiable.

On the other hand the petroleum extracts of sufficient fluidity to be used alone will often have a specific gravity which is so low as to render them unsuited for use without modification. To such extracts a heavier, less fluid tar may be added in proper amount to increase the specific gravity of the mixture substantially above unity while retaining satisfactory volatility and other essential characteristics.

In some instances a middle distillate from the tar may be found more suitable than the whole tar for use in reducing the viscosity and increasing the specific gravity of a petroleum extract. For instance such a middle distillate from coal tar, ordinarily known as creosote oil, has been used with good success. With the particular extracts at hand, from 10 to 30% of creosote oil could be added resulting in a product of entirely satisfactory properties for the service contemplated.

While it is readily apparent that the proportions of ingredients to be employed will depend entirely upon the particular properties of the individual stocks available and the exact service conditions to be encountered, the following table of data will serve to illustrate the several points which have been discussed:

TABLE

*Properties of extracts, tars and blends*

| Sample No. | Materials | Specific gravity @ 60° F. | Viscosity furol | | Cold test, °F. | Distillation temp., °F. | | | | |
|---|---|---|---|---|---|---|---|---|---|---|
| | | | @ 50° F. | @ 100° F. | | Start | 10% | 20% | 40% | 60% |
| 1 | Tar #1 | 1.108 | 63 | 17 | | 316 | 421 | 456 | 539 | 637 |
| 2 | Tar #2 | 1.140 | 1916 | 110 | | 350 | 448 | 480 | 595 | 671 |
| 3 | Extract #1 (heavy) | 1.025 | | 475 | | 584 | 668 | 681 | | |
| 4 | Extract #2 (medium) | 1.009 | 764 | 44 | 10, 5 | 602 | 638 | 650 | 667 | 688 |
| 5 | Extract #1 25%<br>Extract #2 75% | 1.014 | 1800 | 73 | 20, 15 | | | | | |
| 6 | Tar #2 25%<br>Extract #2 75% | 1.037 | 804 | 51 | | | | | | |
| 7 | Tar #1 30%<br>Extract #2 70% | 1.036 | 269 | 27 | −15, −20 | | 547 | 596 | 649 | 680 |
| 8 | Extract #1 42.5%<br>Extract #2 42.5%<br>Creosote oil 15.0% | 1.021 | 520 | 35 | −5, −10 | 430 | 583 | 636 | 690 | |

The medium extract, sample #4, without addition or modification, would be satisfactory for use in warm climate while its blends with an appropriate tar, such as illustrated by sample #7 could be used in average to cold climates.

While no extract of specific gravity less than unity has been included in the foregoing table it will be readily apparent that by the choice of an appropriate heavy tar or tar fraction extracts of specific gravity quite appreciably below 1.00 might be used with satisfactory results.

Having now described our invention and taught how it may be employed, what we claim is:

1. A sealing oil for waterless gas holders, said oil having a specific gravity greater than that of water, a viscosity below about 800 seconds furol at 50° F., an initial boiling point above about 400° F. and comprising a major proportion of an extract obtained by means of a selective solvent from a natural petroleum oil, said extract being largely soluble in liquid sulfur dioxide.

2. A liquid hydrocarbon sealing medium for gas holders of the piston closure type, said hydrocarbon medium having a specific gravity greater than 1.0, a viscosity below about 800 seconds furol at 50° F., a cold test below about 20° F., a 10% distillation point above about 500° F. and comprising a major proportion of an extract obtained by means of a selective solvent from substantially uncracked petroleum oil, said extract being substantially completely soluble in liquid sulfur dioxide.

3. A liquid hydrocarbon sealing medium for gas holders as in claim 2 wherein the extract from petroleum constitutes at least 70% of the total.

4. A liquid hydrocarbon sealing medium for gas holders as in claim 2 wherein the extract from petroleum is blended with a distillate from gas-tar.

5. A liquid hydrocarbon sealing medium for gas holders as in claim 2 wherein the extract from petroleum is blended with from 10 to 30% of creosote oil.

6. A liquid hydrocarbon sealing medium for gas holders of the piston closure type comprising at least 40% of an extract prepared by means of a selective solvent from substantially uncracked petroleum oil, said extract having a viscosity less than about 500 seconds furol at 100° F., boiling above about 550° F. and being substantially soluble in liquid sulfur dioxide.

7. A liquid hydrocarbon sealing medium for gas holders of the piston closure type comprising at least 70% of an extract prepared by means of a selective solvent from a substantially uncracked petroleum distillate, said extract having a viscosity less than about 50 seconds furol at 100° F., having a low cold test, distilling at least 60% between 600 and 700° F. at atmospheric pressure and being substantially completely soluble in liquid sulfur dioxide.

8. As a new composition of matter a blend of creosote oil and an extract prepared by means of a selective solvent from substantially uncracked petroleum oil, said extract having a viscosity less than about 500 seconds furol at 100° F., a 10% distillation point above about 500° F. and being substantially completely soluble in liquid sulfur dioxide.

9. A new composition of matter as in claim 8 wherein the creosote oil constitutes from 10 to 30% of the total.

10. The method of preventing the escape of gas confined within a gas holder of the disc-closure type which comprises sealing the disc against the walls of the holder with a viscous hydrocarbon liquid comprising a major proportion of an extract prepared by means of a selective solvent from uncracked petroleum oil and a minor proportion of a gas-tar distillate, said extract having a viscosity below about 500 seconds furol at 100° F. boiling substantially above 550° F. and being largely soluble in liquid sulfur dioxide.

11. The method as in claim 10 wherein the gas-tar distillate is creosote oil.

WILLIAM HENRY HAMPTON.
THEODORE WILLIAM DOELL.